US009215169B2

United States Patent
LaCroix et al.

(10) Patent No.: US 9,215,169 B2
(45) Date of Patent: Dec. 15, 2015

(54) DELIVERING CORRECT NUMBER INFORMATION IN A PRIVATE SIP NETWORK

(71) Applicant: Verizon Patent and Licensing Inc., Basking Ridge, NJ (US)

(72) Inventors: Jeffrey A. LaCroix, Irving, TX (US); Michael D. Ayers, Columbus, OH (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 248 days.

(21) Appl. No.: 13/894,864

(22) Filed: May 15, 2013

(65) Prior Publication Data

US 2014/0341210 A1    Nov. 20, 2014

(51) Int. Cl.
*H04L 29/06* (2006.01)
*H04L 12/741* (2013.01)
*H04L 12/707* (2013.01)
*H04L 29/12* (2006.01)

(52) U.S. Cl.
CPC .............. *H04L 45/74* (2013.01); *H04L 45/22* (2013.01); *H04L 61/3085* (2013.01); *H04L 65/1006* (2013.01)

(58) Field of Classification Search
CPC ..... H04L 45/74; H04L 65/1006; H04L 45/22; H04L 29/06027; H04L 65/1046; H04L 65/1066; H04L 65/104; H04L 69/40; H04L 67/14; H04L 45/28; H04L 65/1063
See application file for complete search history.

(56) References Cited

U.S. PATENT DOCUMENTS

| | | | | |
|---|---|---|---|---|
| 7,283,516 | B1* | 10/2007 | Ganesan et al. | 370/352 |
| 8,411,665 | B2* | 4/2013 | Ku | H04L 65/1069 370/351 |
| 8,917,858 | B2* | 12/2014 | Duffy | H04L 12/66 379/265.09 |
| 2005/0025130 | A1* | 2/2005 | Hoffmann | 370/352 |
| 2006/0176805 | A1* | 8/2006 | Peters | 370/228 |
| 2008/0153492 | A1* | 6/2008 | Shi et al. | 455/435.1 |
| 2008/0186955 | A1* | 8/2008 | Puckett | 370/352 |
| 2008/0247381 | A1* | 10/2008 | Bohm | H04L 67/104 370/352 |
| 2008/0304471 | A1* | 12/2008 | Jackson et al. | 370/352 |
| 2009/0093250 | A1* | 4/2009 | Jackson | H04L 1/22 455/435.1 |
| 2009/0168986 | A1* | 7/2009 | Jackson et al. | 379/211.01 |
| 2010/0034079 | A1* | 2/2010 | Boucadair | H04L 29/06027 370/218 |

(Continued)

OTHER PUBLICATIONS

Kyzivat, Paul, "[Sip-implementors] BroadSoft's use of Diversion Header." Apr. 4, 2012. https://lists.cs.columbia.edu/pipermail/sip-implementors/2012-April/028370.html. Aug. 26, 2013.

*Primary Examiner* — Gary Mui
*Assistant Examiner* — Michael Phillips

(57) ABSTRACT

A computer device may include logic configured to receive a first Session Initiation Protocol (SIP) message from a telephone device; select a first back-to-back user agent (B2BUA) and a first screened telephone number (STN) associated with the first B2BUA; generate a second SIP message that includes a first destination address of the first B2BUA, and the first STN; and send the second SIP message to the first B2BUA. The logic may further determine that an acknowledgement response has not been received from the first B2BUA; select a second B2BUA, and a second STN associated with the second destination B2BUA, in response to determining that the acknowledgement response has not been received; generate a third SIP message that includes a second destination address of the second B2BUA, and the second STN; and send the third SIP message to the second B2BUA.

20 Claims, 7 Drawing Sheets

(56) References Cited

U.S. PATENT DOCUMENTS

| | | | |
|---|---|---|---|
| 2010/0098069 A1* | 4/2010 | Samarasinghe | 370/352 |
| 2010/0177662 A1* | 7/2010 | Meincke et al. | 370/254 |
| 2011/0141879 A1* | 6/2011 | Ballard | H04L 41/06 370/217 |
| 2011/0216767 A1* | 9/2011 | Ballard | H04L 12/56 370/389 |
| 2011/0271332 A1* | 11/2011 | Jones et al. | 726/7 |
| 2012/0063326 A1* | 3/2012 | Rahman | 370/242 |
| 2012/0113978 A1* | 5/2012 | Cerami et al. | 370/352 |
| 2012/0221707 A1* | 8/2012 | Lindholm et al. | 709/223 |
| 2012/0278649 A1* | 11/2012 | Qiu | H04L 65/1046 714/4.11 |
| 2013/0051213 A1* | 2/2013 | Kaushal | H04L 65/1066 370/216 |
| 2013/0054806 A1* | 2/2013 | Francis | H04L 67/1002 709/226 |
| 2013/0173812 A1* | 7/2013 | Ezell et al. | 709/228 |
| 2014/0241341 A1* | 8/2014 | Terpstra | 370/352 |
| 2014/0325258 A1* | 10/2014 | Mendiratta et al. | 714/4.11 |

* cited by examiner

US 9,215,169 B2

DELIVERING CORRECT NUMBER INFORMATION IN A PRIVATE SIP NETWORK

BACKGROUND INFORMATION

Various technologies exist for the delivery of voice communication over a network. Telephone devices may communicate via the public switched telephone network (PSTN), which is a circuit-switched network that includes telephone lines, fiber-optic cables, microwave transmission links, and other types of links interconnected via switching centers. Voice communication may also be implemented in a packed-switched Internet Protocol (IP) network through the use of Voice over IP (VoIP) technologies. VoIP may be implemented using Session Initiation Protocol (SIP). A private SIP network may be used by an enterprise as an inexpensive solution to connect multiple locations for telephone service.

DETAILED DESCRIPTION OF PREFERRED EMBODIMENTS

Figure 1:
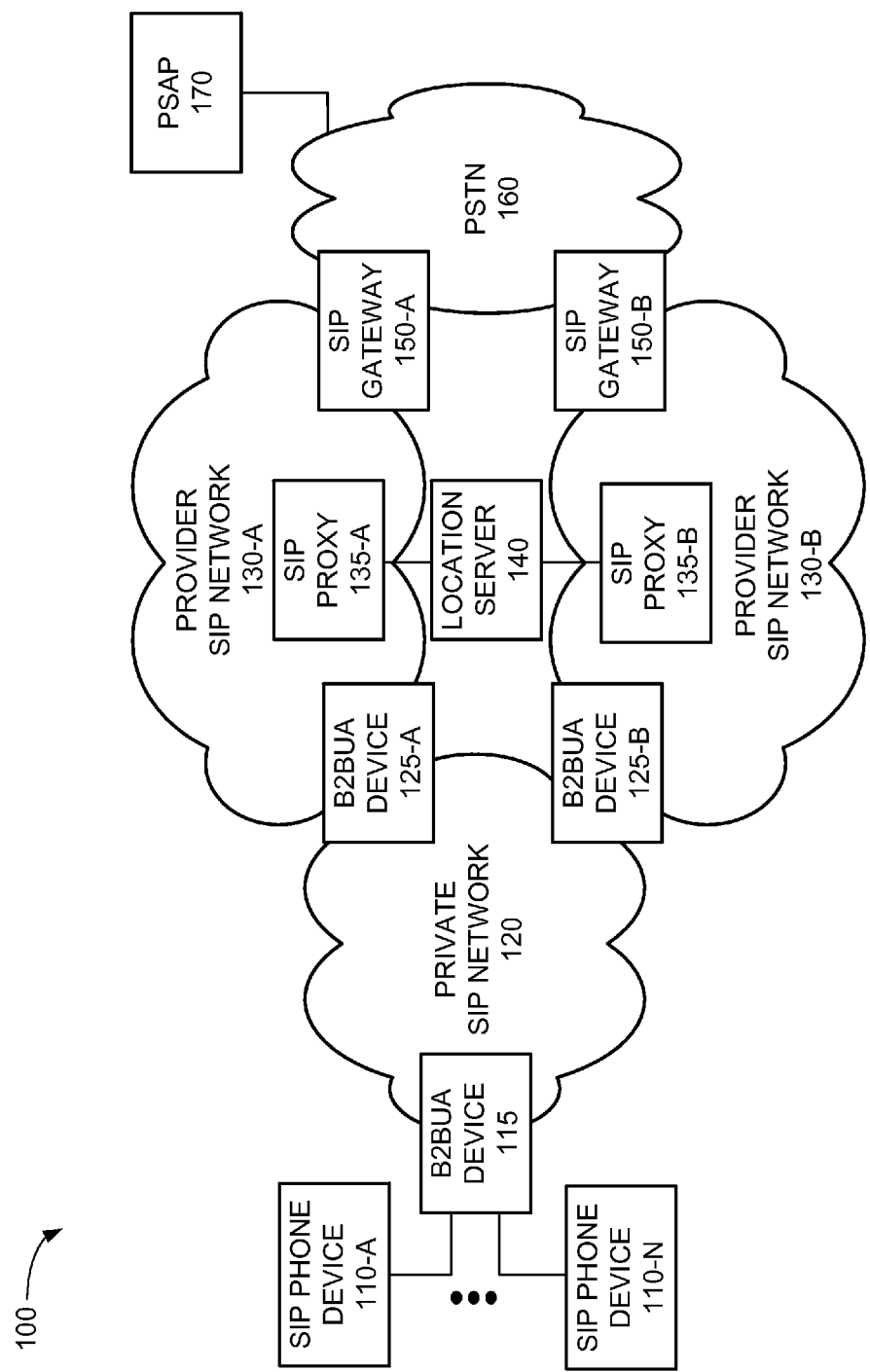
FIG. 1 is a diagram illustrating an exemplary environment according to an implementation described herein.

The following detailed description refers to the accompanying drawings. The same reference numbers in different drawings identify the same or similar elements.

Implementations described herein relate to delivering the correct number information in a private Session Initiation Protocol (SIP) network. Telephone calls from a private SIP network may connect to a carrier network through a geographically disperse set of devices that may be fully meshed for failover. Thus, a particular network element in the private SIP network may route telephone calls through a primary hub and, if a connection through the primary hub fails, may route telephone calls through a secondary hub. Different hubs may connect to different provider SIP networks. A provider SIP network may connect to the public switched telephone network (PSTN). A SIP telephone device in the private SIP network may be associated with a telephone number that is not recognized by the provider SIP network. Thus, the provider SIP network may assign a Screened Telephone Number (STN) to the particular network element in the private SIP network. The network element may place the STN in a diversion header of a SIP call and the STN may provide the SIP call access to the provider SIP network. However, if the primary hub fails and the network element routes SIP calls to the secondary hub, associated with another provider SIP network, the other provider SIP network may not recognize the assigned STN.

An implementation described herein relates to providing a correct STN upon failover on a private SIP network. A private SIP network back-to-back user agent (B2BUA) device may maintain a call sequence table that includes a sequence of destination devices for accessing a provider SIP network, such as a primary destination device, a secondary destination device, a tertiary destination device, etc. Each destination device may be associated with a particular provider SIP network and each destination device may be assigned a particular STN, associated with the particular provider SIP network. The network device may receive a SIP call from a branch telephone device, may add a first diversion header that includes a first destination address of a first (e.g., primary) destination device and a first STN, associated with the first destination device, and may forward the SIP call to the first destination device. If an acknowledgement message is not received from the first destination device within a particular time period or after a particular number of attempts, the network device may determine that a SIP connection to the first destination device has failed and may replace the first diversion header with a second diversion header that includes a second destination address of a second (e.g., secondary) destination device and a second STN, associated with the second destination device, and may forward the SIP call to the second destination device. If an acknowledgement message is not received from the second destination device, the process may be repeated with a tertiary destination device, etc.

An implementation described herein further relates to providing automated number identification (ANI) for emergency calls in a private SIP network. Telephone numbers in the private SIP network may be ported to a provider SIP network and the provider SIP network may register the telephone numbers with a location server. The location server may provide location information for a telephone number from which an emergency call originated. After a telephone number has been ported and registered with the location server, the network device may detect an emergency call from the registered number and may override the insertion of a diversion header, and thus the insertion of an STN, into the SIP call. Thus, the SIP call may not include an STN and the telephone number included in the "From" header of the SIP call may be used to determine a location associated with the SIP call.

FIG. 1 is a diagram of an exemplary environment 100 in which the systems and/or methods described herein may be implemented. As shown in FIG. 1, environment 100 may include SIP phone devices 110-A to 110-N (referred to herein collectively as "SIP phone devices 110" and individually as "SIP phone device 110"), a back-to-back user agent (B2BUA) device 115, a private SIP network 120, a first B2BUA device 125-A, a second B2BUA device 125-B, a first provider SIP network 130-A, a second provider SIP network 130-B, a location server 140, a first SIP gateway 150-A, a second SIP gateway 150-B, a public switched telephone network (PSTN) 160, and a public safety answering point (PSAP) 170.

While FIG. 1 shows a single B2BUA device 115, a single private SIP network 120, two B2BUA devices 125, two provider SIP networks 130, a single location server 140, and a single PSAP 170 for illustrative purposes, in practice, environment 100 may include multiple B2BUA devices 115, multiple private SIP networks 120, a different number of B2BUA devices 125, a different number of provider SIP networks 130, multiple location servers 140, and/or multiple PSAPs 170.

SIP phone device 110 may include any device configured for placing and/or receiving SIP telephone calls. For example, SIP phone device 110 may include a telephone terminal; a personal computer or workstation; a server device; a laptop, tablet, or another type of portable computer; a set-top box; a gaming system; a portable communication device (e.g., a mobile phone, a smart phone, a global positioning system (GPS) device, and/or another type of wireless device); and/or any type of device with communication capability configured for SIP telephone calls. SIP phone devices 110-A to 110-N may be located at a particular location serviced by private SIP network 120, such as a particular office location or building associated with private SIP network 120.

B2BUA device 115 may include any device configured as a SIP B2BUA device. A SIP B2BUA device may divide a SIP communication channel into two call segments, an incoming call segment and an outgoing call segment. A SIP B2BUA may include an answering user agent (UA) that receives SIP messages from another UA, an originating UA that generates SIP messages based on SIP messages received by the answering UA, and call control logic that processes SIP messages received by the answering UA. For example, the call control logic may perform authentication and authorization, may add a diversion header to a SIP message, may process a SIP message based on a particular call scenario script, and/or may perform other processing in a SIP message.

A B2BUA may be implemented, for example, by an Internet Protocol (IP) Private Branch Exchange (PBX). An IP-PBX may function as a telephone exchange for VoIP telephones in a particular business or office location and may process connections among internal VoIP telephones of a private organization associated with the business or office location.

As another example, a B2BUA may be implemented by a Session Border Controller (SBC). An SBC may control setting up, conducting, and terminating of SIP media streams, such as audio or video calls. An SBC may function as an interface device between a branch office and a SIP trunk in a SIP network and may perform security functions for the branch office, such as hiding the connectivity of the branch office from the SIP network, encryption, authentication and/or authorization, and/or other security functions; may perform connectivity functions, such as Network Address Translation (NAT), SIP header manipulation, and/or other connectivity functions; may perform Quality of Service (QoS) functions, such as traffic policing, resource allocation, rate limiting, and/or other QoS functions; and/or may perform other types of functions.

As yet another example, a B2BUA may be implemented by a SIP Application Server (AS). A SIP-AS may perform functions analogous to an SBC and may include additional functionality, such as audio announcement playback, voicemail service, call recording, speech recognition, dual-tone multi-frequency (DMTF) signaling processing, and/or other types of functions.

B2BUA device 115 may function as an exchange for SIP phone devices 110-A to 110-N and may provide access to private SIP network 120 for SIP phone devices 110-A to 110-N. Thus, B2BUA 115 may act as a user agent server for SIP calls originating from SIP phone devices 110 and may process the SIP calls as a user agent client with respect to private SIP network 120. Furthermore, B2BUA 115 may act as a user agent server for SIP calls received via private SIP network 120 and may process the SIP calls as a user agent client with respect to a SIP phone device 110 corresponding to a destination of a SIP call received via private SIP network 120.

Private SIP network 120 may include a SIP network associated with an enterprise, such as a company or an organization. For example, private SIP network 120 may connect multiple branch locations or offices of the enterprise (e.g., a first office in a first city, a second office in a second city, etc.) and each branch location may include a B2BUA device 115 and a set of SIP phone devices 110. Private SIP network 120 may be implemented, for example, in a Multiprotocol Label Switching (MPLS) network implemented in one or more circuit-switched networks and/or packet-switched networks that include a local area network (LAN), a wide area network (WAN), a metropolitan area network (MAN), an ad hoc network, an intranet, the Internet, a fiber optic-based network, a wireless network, and/or any combination of these or other types of networks.

Signals from B2BUA device 115 to B2BUA device 125 may be routed via one or more network devices, such as routers (not shown in FIG. 1). If a particular router, or a connection associated with a particular router, fails, a particular B2BUA device 125 may not be reachable from B2BUA device 115. For example, a router connecting B2BUA device 115 to B2BUA device 125-A may fail and B2BUA device 115 may failover to B2BUA device 125-B.

B2BUA device 125-A may include a B2BUA device that interfaces private SIP network 120 with provider SIP network 130-A. B2BUA device 125-A may act as a user agent server with respect to calls received via private SIP network 120 and may process the SIP calls as a user agent client with respect to provider SIP network 130-A. B2BUA device 125-A may act a user agent server with respect to calls received via provider SIP network 130-A and may process the SIP calls as a user agent client with respect to private SIP network 120.

Provider SIP network 130-A may include a SIP network managed by a provider of communication services. Provider SIP network 130-A interface private SIP network 120 with PSTN 160. Provider SIP network 130-A may be implemented, for example, in an MPLS network implemented in one or more circuit-switched networks and/or packet-switched networks that include a LAN, a WAN, a MAN, an ad hoc network, an intranet, the Internet, a fiber optic-based network, a wireless network, and/or any combination of these or other types of networks.

Provider SIP network 130-A may include a SIP proxy 135-A and a SIP gateway 150-A. SIP proxy 135-A may function as a SIP proxy and may route calls from B2BUA device 125-A to SIP gateway 150-A. Additionally, SIP proxy 135-A may obtain location information for a SIP call from location server 140. Location server 140 may provide location information for telephone numbers. For example, location server 140 may manage one or more databases that associate geographic location information with phone numbers. The location information may be used to identify a location associated with an emergency call.

SIP gateway 150-A may interface provider SIP network 130-A with PSTN 160. For example, SIP gateway 150-A may terminate a SIP call signal, may generate time division multiplexing (TDM) signals, such as Signaling System No. 7 (SS7) signals, based on the SIP call signal, and may provide the TDM signals to PSTN 160. Furthermore, SIP gateway 150-A may receive TDM signals from PSTN 160 and may generate a SIP signal based on the received TDM signals.

B2BUA device 125-B may include a B2BUA device that interfaces private SIP network 120 with provider SIP network 130-B. Provider SIP network 130-B may correspond to a SIP network that is different from, and analogous to, provider SIP network 130-A. For example, provider SIP network 130-A may be located in and serving a first geographic location and provider SIP network 130-B may be located and serving a second geographic location.

B2BUA device 125-B may act as a user agent server with respect to calls received via private SIP network 120 and may process the SIP calls as a user agent client with respect to provider SIP network 130-B. B2BUA device 125-B may act a user agent server with respect to calls received via provider SIP network 130-B and may process the SIP calls as a user agent client with respect to private SIP network 120.

Provider SIP network 130-B may include a SIP proxy 135-B and a SIP gateway 150-B. SIP proxy 135-B may function as a SIP proxy analogous to SIP proxy 135-A described above. SIP gateway 150-B may interface provider SIP network 130-B with PSTN 160 analogous to SIP gateway 150-B described above.

PSTN 160 may include a public circuit-switched telephone network with a global address space, governed by TDM protocols, such as SS7. PSAP 170 may include one or more devices configured for receiving emergency calls. For example, PSAP 170 may include a call center that handles emergency calls for a particular geographic area and that dispatches a particular emergency service to a location within the particular geographic area.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
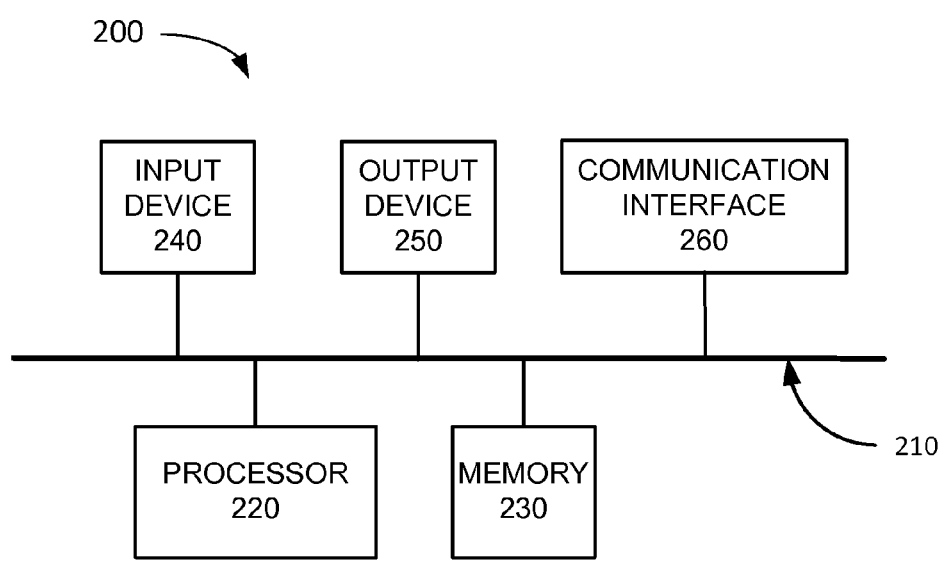
FIG. 2 is a diagram illustrating exemplary components of a device that may be included in one or more components of FIG. 1.

FIG. 2 is a diagram illustrating exemplary components of a device 200 according to an implementation described herein. SIP phone device 110, B2BUA device 115, B2BUA device 125, SIP proxy 135, location server 140, and/or SIP gateway 150 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to processing of SIP calls. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2.

Additionally or alternatively, one or more components of device 200 may perform one or more tasks described as being performed by one or more other components of device 200.

Figure 3:
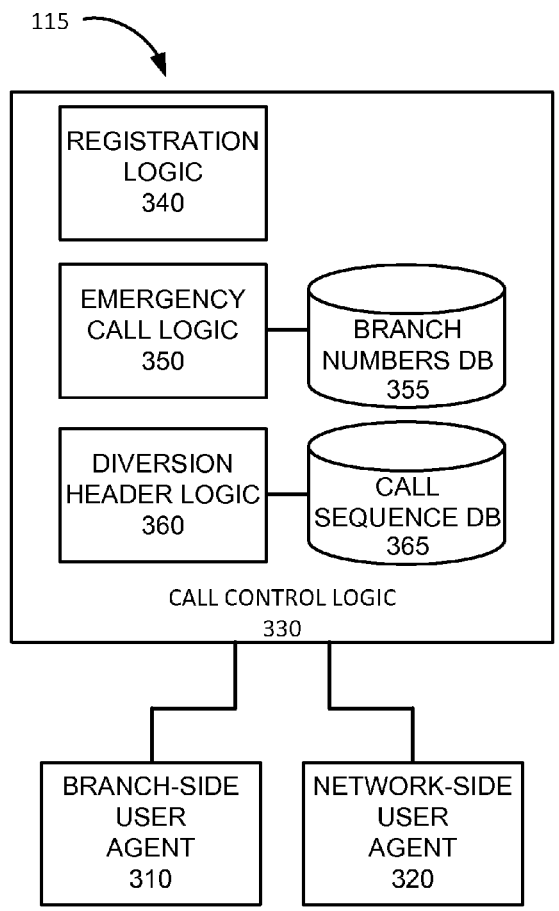
FIG. 3 is a diagram illustrating exemplary functional components of a back-to-back user agent device of FIG. 1.

FIG. 3 is a diagram of exemplary functional components of B2BUA device 115. The functional components of B2BUA device 115 may be implemented, for example, via processor 220 executing instructions from memory 230. Additionally or alternatively, some or all of the functional components of B2BUA device 115 may be hard-wired. As shown in FIG. 3, B2BUA device 115 may include a branch-side UA 310, a network-side UA 320, and call control logic 330.

Branch-side UA 310 may function as a user agent server with respect to SIP calls received from SIP phone devices 110 and may act as a user agent client with respect to outgoing SIP calls to SIP phone devices 110. Network-side UA 320 may function as a user agent server with respect to SIP calls received via private SIP network 120 and may act as a user agent client with respect to calls outgoing via private SIP network 120.

Call control logic 330 may process SIP calls received by branch-side UA 310 or network-side UA 320. Call control logic 330 may include registration logic 340, emergency call logic 350, a branch numbers database (DB) 355, diversion header logic 360, and a call sequence DB 365. Registration logic 340 may register a particular SIP number (e.g., by porting), associated with SIP phone device 110, with provider SIP network 130-A, with provider SIP network 130-B, and/or with another provider SIP network.

Emergency call logic 350 may process emergency calls from SIP phone devices 110. For example, emergency call logic 350 may detect that a received SIP call corresponds to an emergency call and may check branch numbers DB 355 to determine whether the SIP phone number, from which the emergency call originated, has been ported to provider SIP network 130. If the originating SIP phone number has been ported to provider SIP network 130, provider SIP network 130 may be able to obtain location information relating to the originating SIP phone number from location server 140 and emergency call logic 350 may override insertion of a diversion header for the emergency call. If a diversion header is not included in a SIP INVITE message associated with the emergency call, the SIP phone number included in the "From" header of the SIP INVITE message may be used to determine a location associated with the emergency call.

Branch numbers DB 355 may store information relating to branch telephone numbers associated with B2BUA device 115. For example, branch numbers DB 355 may store information about which SIP phone numbers, associated with SIP phone devices 110, have been ported to provider SIP network 130-A and/or to provider SIP network 130-B.

Diversion header logic 360 may generate a diversion header for a SIP call. For example, B2BUA device 115 may receive a SIP INVITE message from SIP phone device 110, may generate a diversion header based on information stored in call sequence DB 365, and may add the diversion header to a SIP INVITE message based on the received SIP INVITE message. Call sequence DB 365 may store information relating to a call sequence to be used in sending a SIP call to provider SIP network 130. Exemplary information that may be stored in call sequence DB 365 is described below with reference to FIG. 4.

Although FIG. 3 shows exemplary functional components of B2BUA device 115, in other implementations, B2BUA device 115 may include fewer functional components, different functional components, differently arranged functional components, or additional functional components than depicted in FIG. 3. Additionally or alternatively, one or more functional components of B2BUA device 115 may perform functions described as being performed by one or more other functional components of B2BUA device 115.

Figure 4:
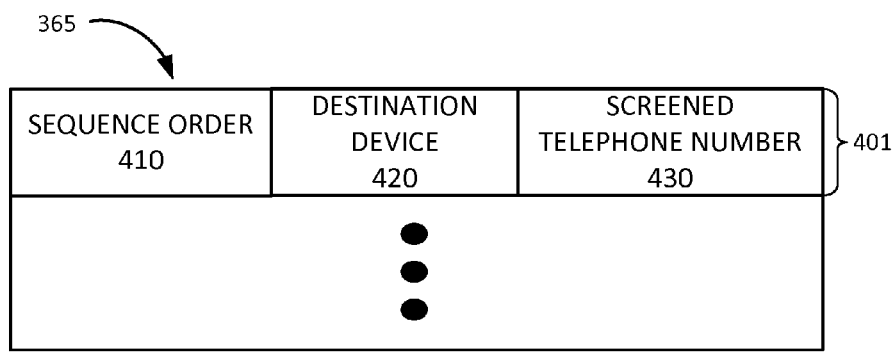
FIG. 4 is a diagram of exemplary information that may be stored in a call sequence database according to an implementation described herein.

FIG. 4 is a diagram of exemplary information that may be stored in call sequence DB 365 according to an implementation described herein. As shown in FIG. 4, call sequence DB 365 may include one or more call sequence entries 401. Each call sequence entry 401 may store information about a particular destination B2BUA device to which a SIP call originating from SIP phone devices 110 should be sent, in the order in which the destination B2BUA devices should be contacted. Call sequence entry 401 may include a sequence order field 410, a destination device field 420, and an STN field 430.

Sequence order field 410 may store the sequence order, and/or an identifier corresponding to the sequence, associated with a particular sequence entry 401 (e.g., primary, secondary, tertiary, etc.). Destination device field 420 may store information relating to a particular destination device associated with the particular sequence entry 401. For example, destination device field 420 may store information identifying a name and/or a destination address of a particular destination B2BUA device 125.

STN field 430 may store an STN associated with the particular destination device. The STN associated with the particular destination device may correspond to the STN assigned to B2BUA device 115 by provider SIP network 130 associated with the particular destination device. For example, if the particular destination device corresponds to B2BUA device 125-A, the particular STN may correspond to the STN assigned to B2BUA device 115 by provider SIP network 130-A.

Although FIG. 4 shows exemplary components of call sequence DB 365, in other implementations, call sequence DB 365 may include fewer components, different components, differently arranged components, or additional components than depicted in FIG. 4.

Figure 5A:
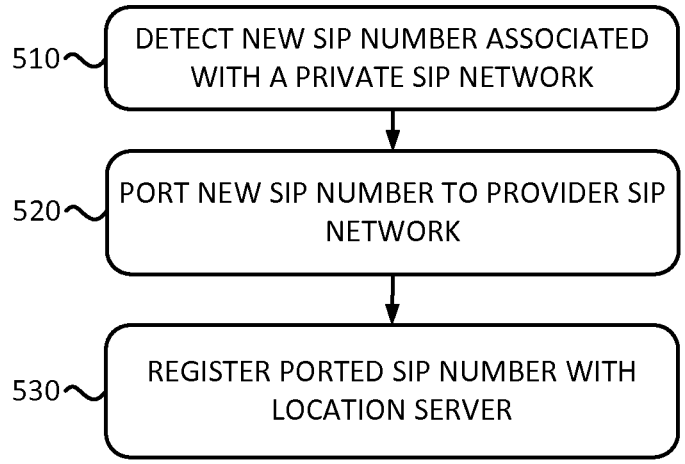
FIGS. 5A and 5B are flow charts of an exemplary process for delivering automated number identification for emergency calls in a private Session Initiation Protocol network according to an implementation described herein.
Figure 5B:
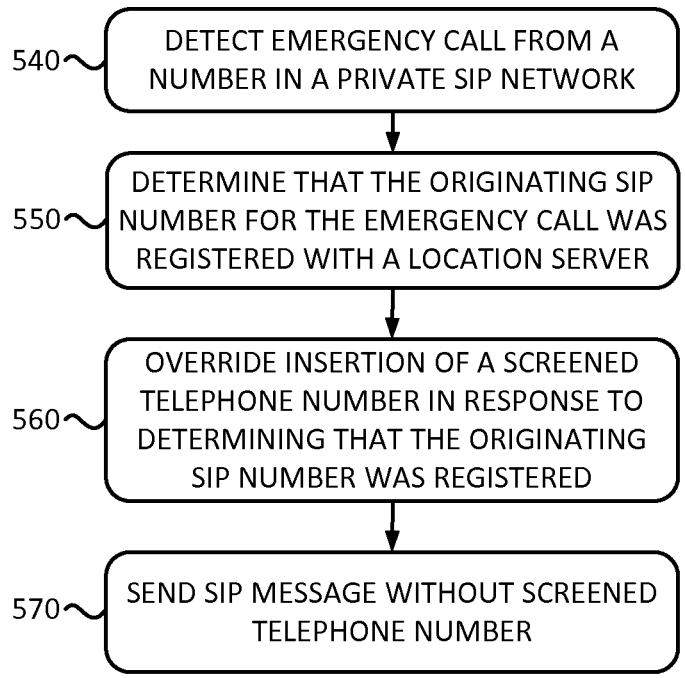

FIGS. 5A and 5B are flow charts of an exemplary process for delivering automated number identification for emergency calls in a private Session Initiation Protocol network according to an implementation described herein. In one implementation, the processes of FIGS. 5A and 5B may be performed by B2BUA device 115 and/or provider SIP network 130. In other implementations, some or all of the processes of FIGS. 5A and 5B may be performed by another device or a group of devices separate from B2BUA device 115 and/or provider SIP network 130 and/or including B2BUA device 115 and/or provider SIP network 130.

FIG. 5A illustrates a process of registering a SIP number, associated with a private SIP network, with a provider SIP network. The process of FIG. 5A may include detecting a new SIP number associated with a private SIP network (block 510). For example, registration logic 340 of B2BUA device 115 may determine that a new SIP phone device 110 has been connected to B2BUA device 115 and that a SIP phone number has been assigned to the new SIP phone device 110.

The new SIP number may be ported to a provider SIP network (block 520). For example, registration logic 340 may port the new SIP phone number to one or more provider SIP networks 130, such as provider SIP network 130-A and/or provider SIP network 130-B, by providing information about the new SIP number to the one or more provider SIP networks 130. The ported SIP number may be registered with a location server (block 530). For example, the one or more provider SIP networks 130 may register the new SIP number with location server 140. Provider SIP network 130 may provide location information to location server 140 along with the new SIP phone number. The location information may correspond to the location information associated with B2BUA device 115, as the new SIP phone device 110 and B2BUA 115 may be in the same location and/or same general environment (e.g., the same building).

FIG. 5B illustrates exemplary processing of an emergency call in a private SIP network. FIG. 5B may include detecting an emergency call from a number in a private SIP network (block 540). For example, branch-side UA 310 of B2BUA device 115 may receive an SIP INVITE message from SIP phone device 110 and emergency call logic 350 may detect that the SIP INVITE message is associated with an emergency call.

A determination may be made that the originating SIP number, associated with the emergency call, was registered with a location server (block 550). For example, emergency call logic 350 may check branch numbers DB 355 to determine that the SIP phone number, associated with SIP phone device 110 that originated the emergency call and included in the "From" header of the SIP INVITE, has been registered with location server 140. Insertion of a screened telephone number (STN) may be overridden in response to determining that the originating SIP number was registered with location server 140 (block 560). For example, emergency call logic 350 may override insertion of a diversion header by diversion header logic 360 and thus diversion header logic 360 may not insert a diversion header into the SIP INVITE message associated with the emergency call.

A SIP message may be sent without a screened telephone number (block 570). Since a diversion header has not been inserted into the SIP INVITE message, the SIP INVITE message may not include an STN and the SIP phone number included in the "From" header may be used by provider SIP network 130 to determine the location for the emergency call.

Figure 6:
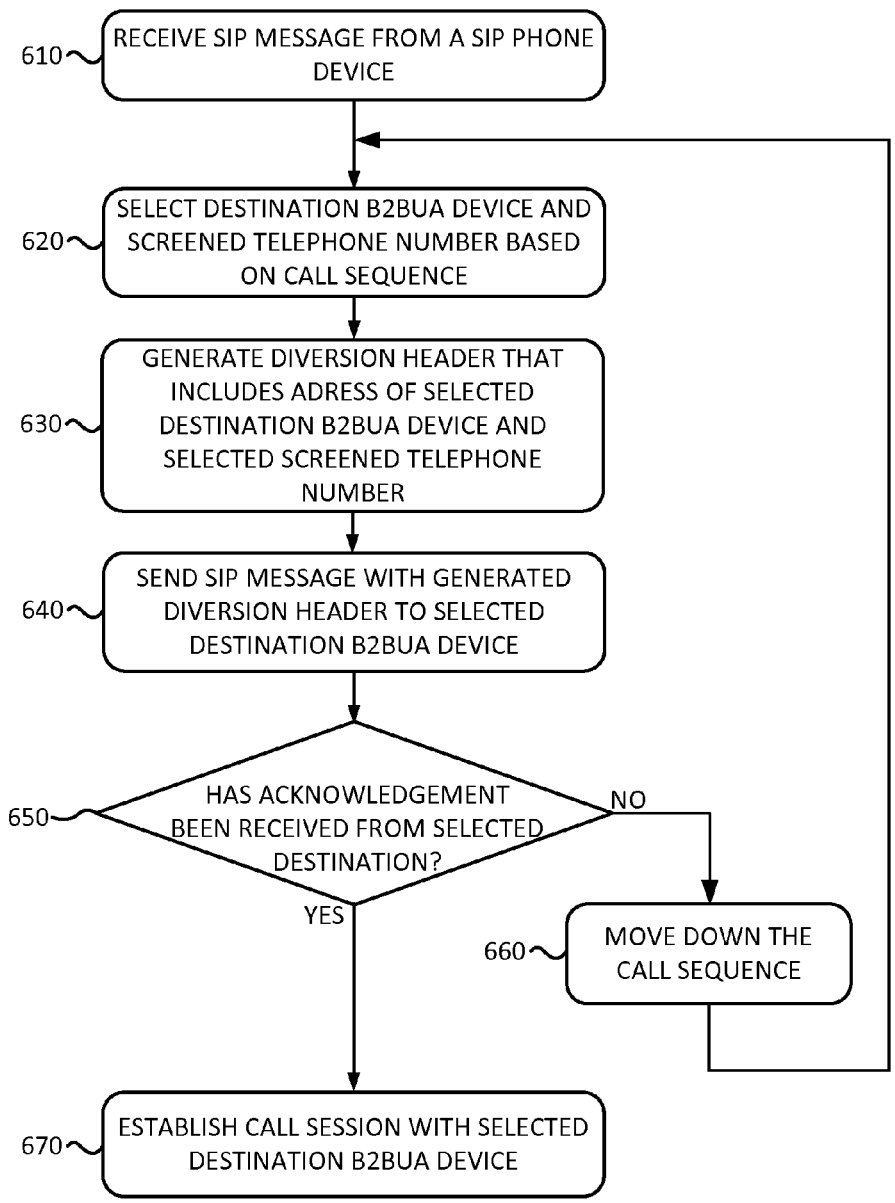
FIG. 6 is a flow chart of an exemplary process for delivering a correct number upon failover in a private Session Initiation Protocol network according to an implementation described herein.

FIG. 6 is a flow chart of an exemplary process for delivering a correct number upon failover in a private SIP network according to an implementation described herein. In one implementation, the process of FIG. 6 may be performed by B2BUA device 115. In other implementations, some or all of the process of FIG. 6 may be performed by another device or a group of devices separate from B2BUA device 115 and/or including B2BUA device 115.

The process of FIG. 6 may include receiving a SIP message from a SIP phone device (block 610). For example, branch-side UA 310 of B2BUA device 115 may receive a SIP INVITE message from SIP phone device 110. A destination B2BUA device and a screened telephone number may be selected based on a call sequence (block 620). For example, diversion header logic 360 may access call sequence DB 365 to determine the primary destination B2BUA and to determine an STN associated with the primary destination B2BUA.

A diversion header may be generated that includes an address of the selected destination B2BUA device and the selected screened telephone number (block 630). For example, diversion header logic 360 may generate a first diversion header that includes an address of the primary destination B2BUA and the STN associated with the primary destination B2BUA. A SIP message with the generated diversion header may be sent to the destination B2BUA device (block 640). For example, network-side UA 320 of B2BUA device 115 may send a SIP message, which includes the generated first diversion header, to the primary destination B2BUA.

A determination may be made as to whether an acknowledgement message has been received from the destination B2BUA device (block 650). For example, network-side UA 320 may wait a particular length of time to receive an acknowledgement message and may re-send the SIP INVITE message if no acknowledgement message has been received within the particular length of time. Network-side UA 320 may re-send SIP INVITE a particular number of times before determining that primary destination B2BUA has failed or is unreachable.

If no acknowledgement message has been received (block 650—NO), processing may move down the call sequence (block 660) and may return to block 620 to select another destination B2BUA device and another screened telephone number. For example, diversion header logic 360 may access call sequence DB 365 to determine the secondary destination B2BUA and to determine an STN associated with the secondary destination B2BUA, may generate a second diversion header that includes an address of the secondary destination B2BUA device and the secondary screened telephone number, and network-side UA 320 of B2BUA device 115 may send a SIP message, which includes the generated second diversion header, to the second destination B2BUA device.

If no acknowledgment is received from the secondary destination B2BUA device, diversion header logic 360 may access call sequence DB 365 to move down the call sequence to determine the tertiary destination B2BUA and to determine an STN associated with the tertiary destination B2BUA, may generate a third diversion header that includes an address of the tertiary destination B2BUA device and the tertiary screened telephone number, and network-side UA 320 of B2BUA device 115 may send a SIP message, which includes the generated third diversion header, to the tertiary destination B2BUA device. The process of moving down the call sequence may be repeated until an acknowledgement is received from a destination B2BUA device or until all entries in call sequence DB 365 have been exhausted.

Returning to block 650, if an acknowledgement message has been received (block 650—YES), a call session with the selected destination B2BUA device may be established (block 670). For example, B2BUA device 115 may establish a SIP call session with the selected destination B2BUA device and may begin to exchange media packets (e.g., audio packets, video packets, etc.) with the selected destination B2BUA device.

Figure 7:
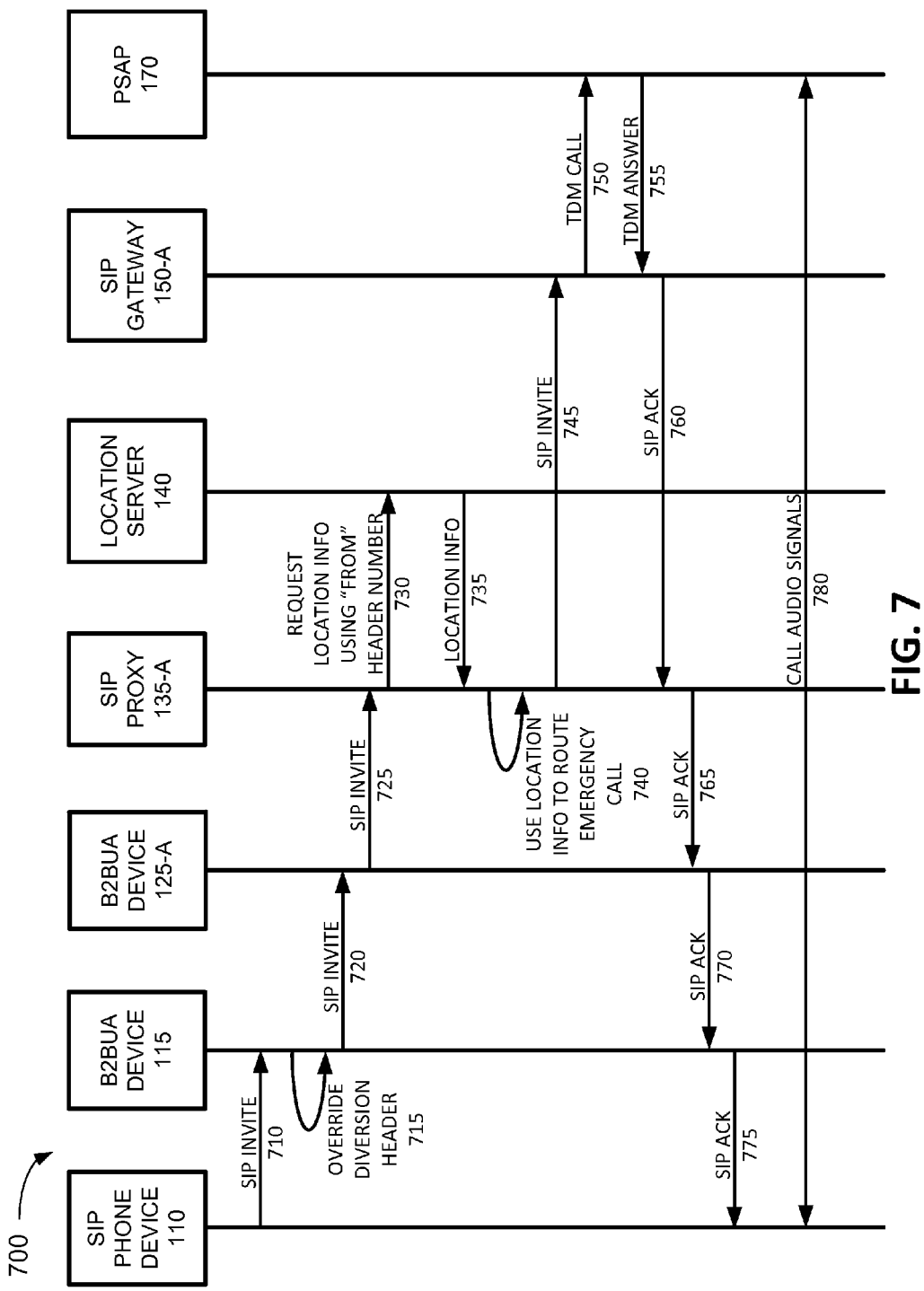
FIG. 7 is an exemplary signal flow for delivering automated number identification for an emergency call according to an implementation described herein.

FIG. 7 is an exemplary signal flow 700 for delivering automated number identification for an emergency call according to an implementation described herein. Signal flow 700 may begin with SIP phone device 110 sending a SIP INVITE message to B2BUA device 115 (signal 710). The SIP INVITE message may correspond to an emergency call. For example, when a user of SIP phone device 110 dials an emergency phone number, SIP phone device 110 may recognize the emergency phone number and may insert an emergency call identifier into the SIP INVITE message. SIP phone device 110 may insert the phone number associated with SIP phone device 110 into a "From" header of the SIP INVITE message.

B2BUA device 115 may detect the emergency call identifier and may select to override insertion of a diversion header into the SIP INVITE message (signal 715). Thus, the phone number of SIP phone device 110, included in the "From" header of the SIP INVITE message, may be used to determine a location associated with the emergency call. B2BUA device 115 may generate a SIP INVITE message based on the SIP INVITE message received from SIP phone device 110 and may send the generated SIP INVITE message across private SIP network 120 to B2BUA device 125-A (signal 720). B2BUA device 125-A receive the private SIP network SIP INVITE message and may generate a SIP INVITE message, based on the received private SIP network SIP INVITE message, in provider SIP network 130-A. The SIP INVITE message may be sent to SIP proxy 135-A (signal 725).

SIP proxy 135-A may send a location information request to location server 140 (signal 730) using the phone number included in the "From" header of the SIP INVITE message. Location server 140 may provide the location information to SIP proxy 135-A (signal 735) and SIP proxy 135-A may use the received location information to route the emergency call to a particular PSAP 170 assigned to the geographic area of the location of SIP phone device 110. For example, SIP proxy 135-A may select a particular SIP gateway 150-A, and/or a destination address associated with the particular PSAP 170, and may forward the SIP INVITE message, received from B2BUA device 125-A, to SIP gateway 150-A (signal 745).

SIP gateway 150-A may generate TDM signals, such as SS7 signals, based on the received SIP INVITE message, in order to secure a circuit between SIP gateway 150-A and PSAP 170 through PSTN 160 (signal 750). PSAP 170 may answer the call (signal 755) and SIP gateway 150-A may, in response, send a SIP ACK message back to SIP proxy 135-A (signal 760) and SIP proxy 135-A may forward the SIP ACK message to B2BUA device 125-A (signal 765). B2BUA device 125-A may receive the SIP ACK message and may generate a SIP ACK message in private SIP network 120, based on the received SIP ACK message. The private SIP network SIP ACK message may be sent through private SIP network 120 to B2BUA device 115 (signal 770). B2BUA device 115 may receive the SIP ACK message and may generate a SIP ACK message to SIP phone device 110 (signal 775). An emergency call connection may now be established between SIP phone device 110 and PSAP 170 and audio signals may be exchanged between SIP phone device 110 and PSAP 170 (signals 780). For example, the caller of SIP phone device 110 may explain to the operator at PSAP 170 the reason for the emergency call.

Figure 8:
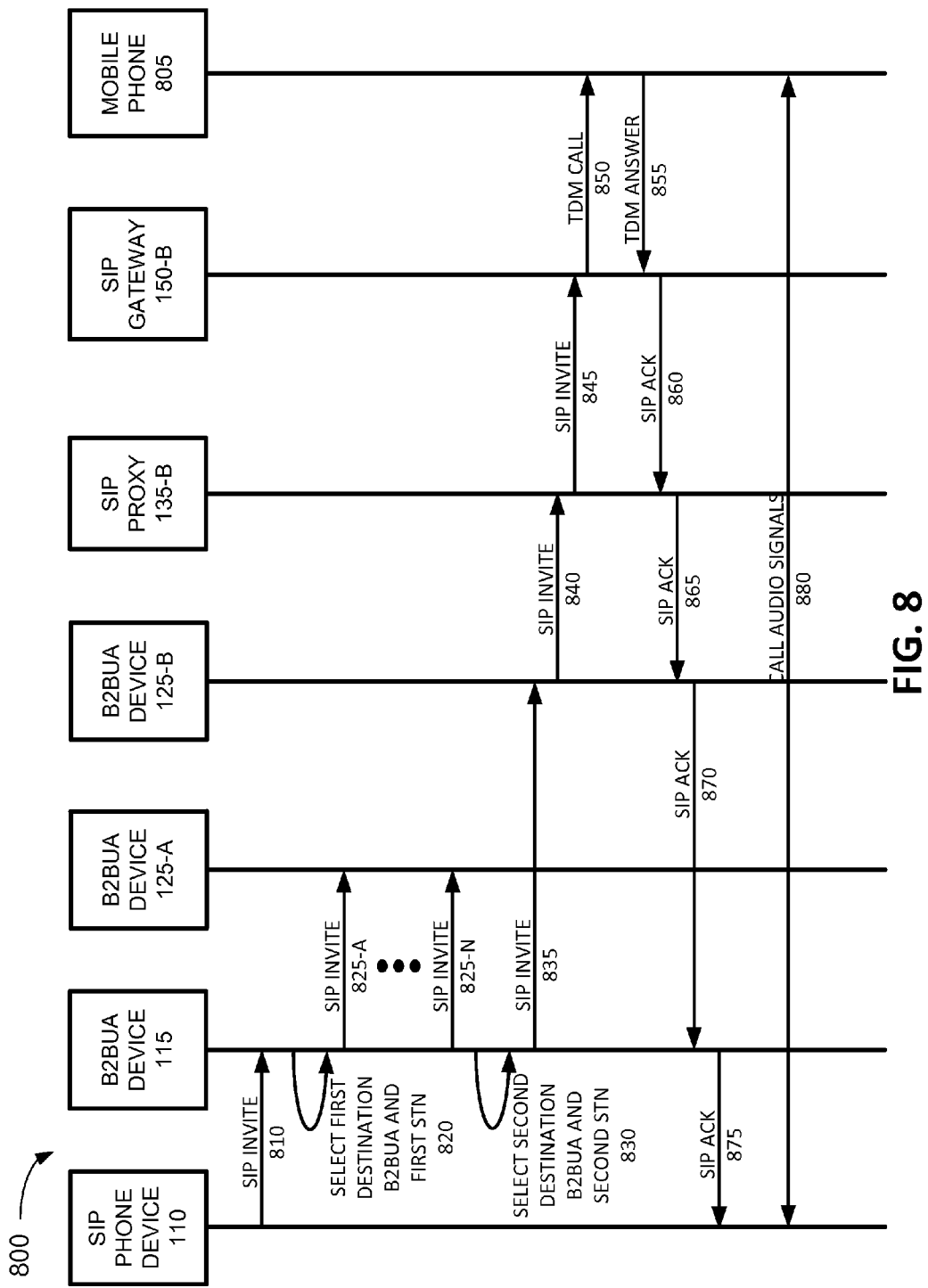
FIG. 8 is an exemplary signal flow delivering a correct number upon failover according to an implementation described herein.

FIG. 8 is an exemplary signal flow 800 delivering a correct number upon failover according to an implementation described herein. Signal flow 800 may begin with SIP phone device 110 sending a SIP INVITE message to B2BUA device 115 (signal 810). Assume the caller using SIP phone device 110 dialed the number of mobile phone 805. Mobile phone 805 may be reachable through PSTN 160. B2BUA device 115 may receive the SIP INVITE message and may access call sequence DB 365 to determine the primary destination B2BUA device for B2BUA device 115. Assume the primary destination B2BUA device is B2BUA device 125-A. B2BUA device 115 may retrieve, from call sequence DB 365, a name and/or address of B2BUA device 125-A and a first STN assigned to B2BUA 115 by provider SIP network 130-A. B2BUA device 115 may generate a first diversion header that includes the address of B2BUA device 125-A and the first STN assigned to B2BUA device 115 by provider SIP network 130-A (signal 820).

B2BUA device 115 may send a SIP INVITE message, including the generated first diversion header, to B2BUA device 125-A across private SIP network 120 (signal 825-A). If no acknowledgement is received within a particular period of time, B2BUA device 115 may resend the SIP INVITE message. B2BUA device 115 may make a particular number of attempts (signals 825-A to 825-N). If no acknowledgement message is received after the particular number of attempts, B2BUA device 115 may determine that B2BUA device 125-A has failed or is unreachable. B2BUA device 115 may access call sequence DB 365 to determine the secondary destination B2BUA device for B2BUA device 115.

Assume the secondary destination B2BUA device is B2BUA device 125-B. B2BUA device 115 may retrieve, from call sequence DB 365, a name and/or address of B2BUA device 125-B and a second STN assigned to B2BUA 115 by provider SIP network 130-B. B2BUA device 115 may generate a second diversion header that includes the address of B2BUA device 125-B and the second STN assigned to B2BUA device 115 by provider SIP network 130-B (signal 835). Assume B2BUA device 125-B receives the SIP INVITE message. B2BUA device 125-B may accept the SIP INVITE message, because B2BUA device 125-B may recognize the second STN included in the second diversion header included in the SIP INVITE message received by B2BUA 125-B.

B2BUA device 125-B receive the private SIP network SIP INVITE message and may generate a SIP INVITE message, based on the received private SIP network SIP INVITE message, in provider SIP network 130-B. The SIP INVITE message may be sent to SIP proxy 135-B (signal 840) and SIP proxy 135-B may forward the SIP INVITE message to SIP gateway 150-B (signal 845).

SIP gateway 150-B may generate TDM signals, such as SS7 signals, based on the received SIP INVITE message, in order to secure a circuit between SIP gateway 150-B and mobile phone 805 through PSTN 160 (signal 850). Mobile phone 805 may answer the call (signal 855) and SIP gateway 150-B may, in response, send a SIP ACK message back to SIP proxy 135-B (signal 860). SIP proxy 135-B may forward the SIP ACK message to B2BUA device 125-B (signal 865). B2BUA device 125-B may receive the SIP ACK message and may generate a SIP ACK message in private SIP network 120, based on the received SIP ACK message. The private SIP network SIP ACK message may be sent through private SIP network 120 to B2BUA device 115 (signal 870). B2BUA device 115 may receive the SIP ACK message and may generate a SIP ACK message to SIP phone device 110 (signal 875). A call connection may now be established between SIP phone device 110 and mobile phone 805 and audio signals may be exchanged between SIP phone device 110 and mobile phone 805 (signals 880).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 5A, 5B, and 6, the order of the blocks may be modified in other implementations. Further, non-dependent blocks may be performed in parallel. As another example, while series of signal flows have been described with respect to FIGS. 7 and 8, the order of the signal flows may be modified in other implementations. Further, non-dependent signal flows may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a computer device, the method comprising:
    receiving, by the computer device, a first Session Initiation Protocol message from a telephone device;
    selecting, by the computer device, a first destination back-to-back user agent, and a first screened telephone number associated with the selected first destination back-to-back user agent, based on a call sequence, wherein the first screened telephone number is assigned to the computer device by a first provider Session Initiation Protocol network associated with the selected first destination back-to-back user agent;
    generating, by the computer device, a second Session Initiation Protocol message based on the received first Session Initiation Protocol message, wherein the second Session Initiation Protocol message includes a first destination address, associated with the selected first destination back-to-back user agent, and the first screened telephone number;
    sending, by the computer device, the second Session Initiation Protocol message to the selected first destination back-to-back user agent;
    determining, by the computer device, that an acknowledgement response has not been received from the selected first destination back-to-back user agent;
    selecting, by the computer device, a second destination back-to-back user agent, and a second screened telephone number associated with the selected second destination back-to-back user agent, based on the call sequence, in response to determining that the acknowledgement response has not been received from the selected first destination back-to-back user agent, wherein the second screened telephone number is assigned to the computer device by a second provider Session Initiation Protocol network associated with the selected second destination back-to-back user agent;
    generating, by the computer device, a third Session Initiation Protocol message based on the received first Session Initiation Protocol message, wherein the third Session Initiation Protocol message includes a second destination address, associated with the selected second destination back-to-back user agent, and the second screened telephone number; and
    sending, by the computer device, the third Session Initiation Protocol message to the selected second destination back-to-back user agent.

2. The method of claim 1, wherein the computer device functions as a back-to-back user agent in a private Session Initiation Protocol network, wherein the first destination back-to-back user agent functions as a first access device from the private Session Initiation Protocol network to the first provider Session Initiation Protocol network, and wherein the second destination back-to-back user agent functions as a second access device from the private Session Initiation Protocol network to the second provider Session Initiation Protocol network.

3. The method of claim 1, wherein generating the second Session Initiation Protocol message based on the received first Session Initiation Protocol message includes:
    including a first diversion header in the second Session Initiation Protocol message, wherein the first diversion header includes the first destination address and the first screened telephone number.

4. The method of claim 1, wherein generating the third Session Initiation Protocol message based on the received first Session Initiation Protocol message includes:
    including a second diversion header in the third Session Initiation Protocol message, wherein the second diversion header includes the second destination address and the second screened telephone number.

5. The method of claim 1, wherein the computer device includes:
    an Internet Protocol Private Branch Exchange device;
    a Session Border Controller device; or
    a Session Initiation Protocol Application Server device.

6. The method of claim 1, wherein at least one of the first destination back-to-back user agent or the second destination back-to-back user agent includes:
    an Internet Protocol Private Branch Exchange device;
    a Session Border Controller device; or
    a Session Initiation Protocol Application Server device.

7. The method of claim 1, further comprising:
    determining that an acknowledgement response has not been received from the second destination back-to-back user agent;
    selecting a third destination back-to-back user agent, and a third screened telephone number associated with the third destination back-to-back user agent, based on the call sequence, in response to determining that the acknowledgement response has not been received from the second destination back-to-back user agent;
    generating a fourth Session Initiation Protocol message based on the received first Session Initiation Protocol message, wherein the fourth Session Initiation Protocol message includes a third destination address, associated with the selected third destination back-to-back user agent, and the third screened telephone number; and
    sending the fourth Session Initiation Protocol message to the selected third destination back-to-back user agent.

8. The method of claim 1, further comprising:
    detecting a new Session Initiation Protocol number associated with the telephone device;
    porting the new Session Initiation Protocol number to the first provider Session Initiation Protocol network, associated with the first destination back-to-back user agent device, wherein porting the new Session Initiation Protocol number includes registering the new Session Initiation Protocol number with an emergency calls location server; and
    porting the new Session Initiation Protocol number to the second provider Session Initiation Protocol network, associated with the second destination back-to-back user agent device, wherein porting the new Session Initiation Protocol number includes registering the new Session Initiation Protocol number with the emergency calls location server.

9. The method of claim 8, further comprising:
detecting an emergency call from the telephone device;
determining that the new Session Initiation Protocol number, associated with the telephone device, has been registered with the emergency calls location server; and
overriding insertion of a screened telephone number into a Session Initiation Protocol message associated with the emergency call, in response to determining that the new Session Initiation Protocol number has been registered with the emergency calls location server, wherein overriding the insertion of the screened telephone number into the Session Initiation Protocol message results in the new Session Initiation Protocol number being used by the emergency calls location server to determine a location associated with the telephone device.

10. A computer device comprising:
logic configured to:
receive a first Session Initiation Protocol message from a telephone device;
select a first destination user agent, and a first screened telephone number associated with the selected first destination user agent, based on a call sequence, wherein the first screened telephone number is assigned to the computer device by a first provider Session Initiation Protocol network associated with the selected first destination user agent;
generate a second Session Initiation Protocol message based on the received first Session Initiation Protocol message, wherein the second Session Initiation Protocol message includes a first destination address, associated with the selected first destination user agent, and the first screened telephone number;
send the second Session Initiation Protocol message to the selected first destination user agent;
determine that an acknowledgement response has not been received from the first destination user agent;
select a second destination user agent, and a second screened telephone number associated with the selected second destination user agent, based on the call sequence, in response to determining that the acknowledgement response has not been received from the first destination user agent, wherein the second screened telephone number is assigned to the computer device by a second provider Session Initiation Protocol network associated with the selected second destination user agent;
generate a third Session Initiation Protocol message based on the received first Session Initiation Protocol message, wherein the third Session Initiation Protocol message includes a second destination address, associated with the selected second destination user agent, and the second screened telephone number; and
send the third Session Initiation Protocol message to the selected second destination user agent.

11. The computer device of claim 10, wherein the computer device functions as a user agent in a private Session Initiation Protocol network, wherein the first destination user agent functions as a first access device from the private Session Initiation Protocol network to the first provider Session Initiation Protocol network, and wherein the second destination user agent functions as a second access device from the private Session Initiation Protocol network to the second provider Session Initiation Protocol network.

12. The computer device of claim 10, wherein when generating the second Session Initiation Protocol message, the logic is further configured to:
include a first diversion header in the second Session Initiation Protocol message, wherein the first diversion header includes the first destination address and the first screened telephone number; and wherein, when generating the third Session Initiation Protocol message, the logic is further configured to:
include a second diversion header in the third Session Initiation Protocol message, wherein the second diversion header includes the second destination address and the second screened telephone number.

13. The computer device of claim 10, wherein the computer device includes:
an Internet Protocol Private Branch Exchange device;
a Session Border Controller device; or
a Session Initiation Protocol Application Server device.

14. The computer device of claim 10, wherein the logic is further configured to:
determine that an acknowledgement response has not been received from the second destination user agent;
select a third destination user agent, and a third screened telephone number associated with the third destination user agent, based on the call sequence, in response to determining that the acknowledgement response has not been received from the second destination user agent, wherein the third screened telephone number is assigned to the computer device by a third provider Session Initiation Protocol network associated with the third destination user agent;
generate a fourth Session Initiation Protocol message based on the received first Session Initiation Protocol message, wherein the fourth Session Initiation Protocol message includes a third destination address, associated with the selected third destination user agent, and the third screened telephone number; and
send the fourth Session Initiation Protocol message to the selected third destination user agent.

15. The computer device of claim 10, wherein the logic is further configured to:
detect a new Session Initiation Protocol number associated with the telephone device; and
port the new Session Initiation Protocol number to the first provider Session Initiation Protocol network, associated with the first destination user agent device, wherein porting the new Session Initiation Protocol number includes registering the new Session Initiation Protocol number with an emergency calls location server.

16. The computer device of claim 15, wherein the logic is further configured to:
detect an emergency call from the telephone device;
determine that the new Session Initiation Protocol number, associated with the telephone device, has been registered with the emergency calls location server; and
override insertion of a screened telephone number into a Session Initiation Protocol message associated with the emergency call, in response to determining that the new Session Initiation Protocol number has been registered with the emergency calls location server, wherein overriding the insertion of the screened telephone number into the Session Initiation Protocol message results in the new Session Initiation Protocol number being used by the emergency calls location server to determine a location associated with the telephone device.

17. A non-transitory computer-readable medium, storing instructions executable by one or more processors, the non-transitory computer-readable medium comprising:

one or more instructions to receive, by a computer device, a first Session Initiation Protocol message from a branch telephone device;

one or more instructions to select a first destination back-to-back user agent, and a first screened telephone number associated with the selected first destination back-to-back user agent, based on a call sequence, wherein the first screened telephone number is assigned to the computer device by a first provider Session Initiation Protocol network associated with the selected first destination back-to-back user agent;

one or more instructions to generate a second Session Initiation Protocol message based on the received first Session Initiation Protocol message, wherein the second Session Initiation Protocol message includes a first destination address, associated with the selected first destination back-to-back user agent, and the first screened telephone number;

one or more instructions to send the second Session Initiation Protocol message to the selected first destination back-to-back user agent;

one or more instructions to determine that an acknowledgement response has not been received from the first destination back-to-back user agent;

one or more instructions to select a second destination back-to-back user agent, and a second screened telephone number associated with the selected second destination back-to-back user agent, based on the call sequence, in response to determining that the acknowledgement response has not been received from the first destination back-to-back user agent, wherein the second screened telephone number is assigned to the computer device by a second provider Session Initiation Protocol network associated with the selected second destination back-to-back user agent;

one or more instructions to generate a third Session Initiation Protocol message based on the received first Session Initiation Protocol message, wherein the third Session Initiation Protocol message includes a second destination address, associated with the selected second destination back-to-back user agent, and the second screened telephone number; and one or more instructions to send the third Session Initiation Protocol message to the selected second destination back-to-back user agent.

18. The non-transitory computer-readable medium of claim 17, wherein the one or more instructions to generate the second Session Initiation Protocol message include:

one or more instructions to include a first diversion header in the second Session Initiation Protocol message, wherein the first diversion header includes the first destination address and the first screened telephone number; and wherein the one or more instructions to generate the third Session Initiation Protocol message include:

one or more instructions to include a second diversion header in the third Session Initiation Protocol message, wherein the second diversion header includes the second destination address and the second screened telephone number.

19. The non-transitory computer-readable medium of claim 17, further comprising:

one or more instructions to detect a new Session Initiation Protocol number associated with the branch telephone device; and one or more instructions to port the new Session Initiation Protocol number to the first provider Session Initiation Protocol network, associated with the first destination back-to-back user agent device, wherein porting the new Session Initiation Protocol number includes registering the new Session Initiation Protocol number with an emergency calls location server.

20. The non-transitory computer-readable medium of claim 19, further comprising:

one or more instructions to detect an emergency call from the branch telephone device;

one or more instructions to determine that the new Session Initiation Protocol number, associated with the branch telephone device, has been registered with the emergency calls location server; and one or more instructions to override insertion of a screened telephone number into a Session Initiation Protocol message associated with the emergency call, in response to determining that the new Session Initiation Protocol number has been registered with the emergency calls location server, wherein overriding the insertion of the screened telephone number into the Session Initiation Protocol message results in the new Session Initiation Protocol number being used by the emergency calls location server to determine a location associated with the branch telephone device.

* * * * *